March 13, 1962 J. W. TAMPLEN 3,024,807
PILOT VALVE
Filed Nov. 24, 1958
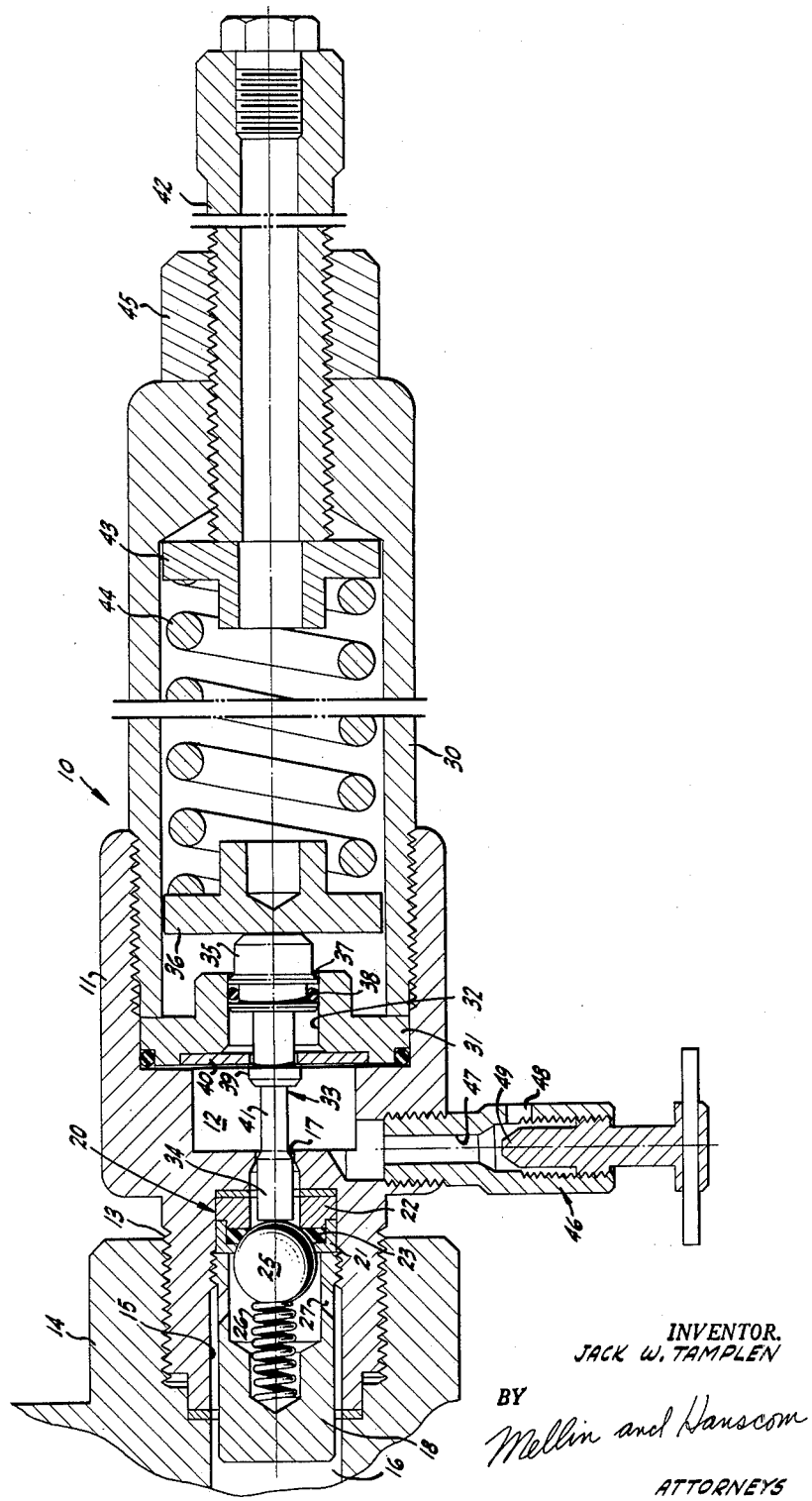
INVENTOR.
JACK W. TAMPLEN
BY
Mellin and Hanscom
ATTORNEYS

United States Patent Office 3,024,807
Patented Mar. 13, 1962

3,024,807
PILOT VALVE
Jack W. Tamplen, Celina, Tex., assignor to Otis Engineering Corporation, Dallas, Tex., a corporation of Delaware
Filed Nov. 24, 1958, Ser. No. 776,129
4 Claims. (Cl. 137—613)

This invention relates to pilot valves, and, more particularly, to pilot valves automatically operable to vent a fluid filled chamber to atmosphere upon the occurrence of a predetermined low pressure therein.

An example of such use of a pilot valve, constructed in accordance with the present invention, is in conjunction with a pressure operated main flow line control valve, as, for example, the type illustrated and described in H. C. Otis Patent No. 2,566,772, wherein the main control valve is held in open position by a valve operator actuated by line pressure. A pilot valve is used to exhaust the control valve operator to atmosphere when the line pressure reaches a predetermined minimum amount, thus allowing the control valve to close. The present invention is an improved version of the pilot valve designated as "A" in the above mentioned patent.

An object of the present invention is to provide a pilot valve which operates automatically to vent a fluid filled chamber to atmosphere upon the occurrence of a predetermined minimum pressure within said chamber.

Another object is to provide a pilot valve as set forth in the last object, which will not oscillate between open and closed positions as it vents the pressure chamber and the pressure therein decreases.

Another object is to provide a pilot valve as set forth above which is easily reset to closed position after a venting operation.

Another object is to provide such a pilot valve which can be easily set to open at different desired pressures and which has a minimum of operating parts.

Other objects and advantages will become apparent in the course of the following detailed description.

In the drawings, forming a part of this application, the single figure shows a cross-sectional view of a pilot valve constructed in accordance with the present invention.

Referring now to the drawing, the pilot valve, generally indicated by the reference numeral 10, comprises a housing member 11 having a piston chamber 12 formed therein. The housing member 11 is provided with threads 13 enabling the pilot valve to be connected to a pressure chamber housing 14 so that the inlet passage 15 of the pilot valve will be in communication with the interior of the pressure chamber 16. The inlet passage 15 is restricted at 17 as it enters the piston chamber 12.

A seat retainer 18 is threaded into the inlet passage 15 to retain the valve seat unit 20 in place. This unit comprises valve seat members 21 and 22 having O-ring 23 disposed therebetween, forming a spherical valve seat facing away from piston chamber 12.

The seat retainer 18 is hollow to accommodate freely ball valve member 25 therein, which ball valve is normally biased by spring 26 into seating engagement with the valve seat 20. Side ports 27 through the seat retainer allow fluid flow through the inlet passage.

A spring housing 30 is connected to the housing member 11, and, when in place as shown, secures piston cylinder element 31 in place relative to the housing member. The cylinder element has a bore 32 therethrough, coaxial to inlet passage 15, which forms a portion of the piston chamber 12.

A plunger 33 extends through the piston chamber 12, with one end 34 thereof extending through the restricted portion 17 of inlet passage 15 into engagement with the ball valve 25. The other end 35 of the plunger extends through the cylinder bore 32 into engagement with spring guide 36.

An enlarged piston head 37 is formed on plunger 33 and is sealed by O-ring 38 to bore 32 for sliding movement therein. Movement of the plunger 33 to the right is limited by engagement of the plunger shoulder 39 with the ring stop 40.

The plunger 33 is reduced in diameter at 41 so as to permit fluid flow through the inlet passage 15 into the piston chamber 12 when the ball 25 is forced from the valve seat by the plunger. The reduced plunger portion 41 and the restricted inlet passage portion 17 also act in conjunction as a restricted orifice to limit such flow.

A spring adjustment screw 42 is threaded through the spring housing 30 and bears against spring guide 43. A compression spring 44 is confined between the spring guides 36 and 43. Once a desired amount of compressive force has been placed on spring 44 by the adjustment of screw 42, the screw is then locked against turning by lock nut 45.

A bleed-off valve assembly 46, connected to the housing member 11, provides a discharge conduit 47 and a port 48 whereby the piston chamber 12 may be vented to atmosphere. A manually operable valve member 49 is provided to open and close the discharge conduit, as desired. The discharge flow path through the valve assembly 46 (when the valve member 49 is open) is greater in cross section throughout its length than the restricted flow area formed by the plunger portion 41 and the inlet passage portion 17, for a purpose to be hereinafter described.

In the operation of the pilot valve 10, let it be assumed that: the adjustment screw 42 has been set to provide a desired force on spring 44, the pressure in the pressure chamber 16 is above the predetermined minimum amount at which it is to be vented, and manually operable valve member 49 is open. Under these conditions, the pilot valve will be as shown in the drawing, with the ball valve 25 being seated on valve seat 20 because the combined pressure of the fluid in pressure chamber 16 and spring 26 (both forcing the ball valve to the right), is greater than the force of spring 44, exerted on the ball valve through plunger 33 (forcing the ball valve to the left). The discharge conduit 47 is open, placing the piston chamber 12 at atmospheric pressure.

The spring 44 exerts a greater force on the ball valve than does spring 26, and thus the ball valve will only be seated if the force exerted thereon by the pressure in pressure chamber 16 is greater than the difference in forces exerted on the ball by springs 44 and 26. If the fluid pressure in the pressure chamber 16 should decrease sufficiently, spring 44 will cause the plunger 33 to unseat the ball valve from the valve seat 20, and the pressure chamber 16 will be immediately bled through the inlet passage 15 into the piston chamber 12 and out to atmosphere through the discharge conduit 47.

As has been set forth above, the discharge conduit has a greater capacity than that of the inlet passage, and consequently the pressure in the piston chamber cannot build up sufficiently to act upon piston 37 to move the piston and plunger to the right. If this could occur, the ball valve 25 could become reseated, but it would be immediately unseated by the plunger when the pressure in the piston chamber decreases by bleeding through the discharge conduit. This seating and unseating would produce a highly undesirable chattering of the ball valve and would result in the quick deterioration of the pilot valve. However, with the construction of the pilot valve, as set forth herein, the ball valve, after initial opening, remains open while the pressure chamber is bled to atmosphere.

To reset the pilot valve for another operation, the manually operable valve member 49 is closed, thereby preventing the piston chamber 12 from venting to atmosphere, and pressure is built up in the pressure chamber 16 from a suitable source (not shown). The ball valve will remain unseated during this build up of pressure, due to the force of spring 44, and consequently the piston chamber 12 will be at the same pressure as the pressure chamber 16, with this pressure being exerted on the piston 37 urging it to the right. Eventually, the force on piston 37 will be sufficient to overcome the force exerted thereon by spring 44, and the piston and plunger will move to the right, allowing the ball valve 25 to be reseated by spring 26, so as to again seal the piston chamber 12 from the pressure chamber 16. The manually operable valve 49 is opened, venting the piston chamber to atmosphere. This places the pilot valve in the position shown in the drawing, again ready for a venting operation should the pressure in pressure chamber 16 fall below the permissible minimum value.

As is apparent, the pilot valve can be set to operate at any desired pressure by simply adjusting the initial compression of spring 44 by means of the adjustment screw 42.

It is to be realized that the form of the invention herewith shown and described is to be taken as a preferred embodiment of the same, and that various changes in the shape, size and arrangement of parts may be resorted to without departing from the spirit of the invention or the scope of the attached claims.

Having thus described my invention, what I claim and desire to secure by Letters Patent is:

1. A pressure relief pilot valve comprising a housing member having a piston chamber therein, a piston longitudinally slidably disposed in said chamber, means resiliently biasing said piston for movement in one direction in said piston chamber, said housing member having an inlet passage formed therein, a valve seat formed in said inlet passage and facing away from said piston chamber, a ball valve member removably seatable upon said valve seat, plunger means movable with said piston and extending therefrom into engagement with said ball valve member, an outlet conduit communicating said piston chamber to atmosphere, and a valve in said outlet conduit for opening and closing said outlet conduit, said outlet conduit having a cross-sectional flow area throughout its length when said outlet conduit valve is open which flow area is greater than that of the most restricted portion of said inlet passage when said first named valve member is moved from said valve seat by said plunger.

2. A pressure relief pilot valve comprising a housing member having a piston chamber therein, a piston disposed in said chamber for reciprocatory sliding movement therein, seal means disposed between said piston and piston chamber, spring means resiliently biasing said piston for movement in one direction in said piston chamber, said housing member having an inlet passage formed therein, said inlet passage having a restricted portion thereof opening into said piston chamber, means for connecting said inlet passage to a source of fluid pressure to be controlled by said pilot valve, a valve seat formed in the restricted portion of said inlet passage and facing away from said piston chamber, a valve member disposed in said inlet passage and seatable upon said valve seat, plunger means movable with said piston in said one direction and extending through said restricted portion of said inlet passage into engagement with said valve member, an outlet conduit communicating said piston chamber to atmosphere, and a valve member in said outlet conduit for opening and closing said outlet conduit, said outlet conduit having a cross-sectional flow area throughout its length when said last named valve member is open which flow area is greater than that of the most restricted portion of said inlet passage when said first named valve member is moved from said valve seat by said plunger.

3. A pressure relief pilot valve comprising a housing member having a piston chamber therein, a piston disposed in said chamber for reciprocatory sliding movement therein, seal means disposed between said piston and piston chamber, spring means resiliently biasing said piston for movement in one direction in said piston chamber, adjustment means for varying the force of said spring means on said piston, said housing member having an inlet passage formed therein, said inlet passage having a restricted portion thereof opening into said piston chamber, a valve seat formed in the restricted portion of said inlet passage and facing away from said piston chamber, a ball valve member disposed in said inlet passage and seatable upon said valve seat, means movable with said piston and extending therefrom into engagement with said ball valve member, an outlet conduit communicating said piston chamber to atmosphere, and a manually operable valve member in said outlet conduit for opening and closing said outlet conduit, said outlet conduit having a cross-sectional flow area throughout its length when said last named valve member is open which flow area is greater than that of the most restricted portion of said inlet passage when said ball valve member is moved from said valve seat by said plunger.

4. A pressure relief pilot valve comprising a housing member having a piston chamber therein, a piston disposed in said chamber for reciprocatory longitudinal sliding movement therein, seal means disposed between said piston and piston chamber, first spring means resiliently biasing said piston for movement in one direction in said piston chamber, adjustment means for varying the force of said spring means on said piston, said housing member having an inlet passage formed therein, said inlet passage having a restricted portion thereof opening into said piston chamber, means for connecting said inlet passage to a source of fluid pressure to be controlled by said pilot valve, a valve seat formed in the restricted portion of said inlet passage and facing away from said piston chamber, a ball valve member disposed in said inlet passage and seatable upon said valve seat, second spring means for resiliently holding said ball valve member on said valve seat, said second spring means being weaker than said first spring means, plunger means movable with said piston in said one direction and extending through said restricted portion of said inlet passage into engagement with said ball valve member, an outlet conduit communicating said piston chamber to atmosphere and a manually operable valve member in said outlet conduit for opening and closing said outlet conduit, said outlet conduit having a cross-sectional flow area throughout its length when said last named valve member is open which flow area is greater than that of the most restricted portion of said inlet passage when said ball valve member is moved from said valve seat by said plunger.

References Cited in the file of this patent

UNITED STATES PATENTS

| | | |
|---|---|---|
| 598,579 | Shields | Feb. 8, 1898 |
| 763,162 | Curran | June 21, 1904 |
| 926,787 | Virkler | July 6, 1909 |
| 1,003,916 | Koenig | Sept. 19, 1911 |

FOREIGN PATENTS

| | | |
|---|---|---|
| 707,970 | Great Britain | of 1954 |